(12) United States Patent
Fennema et al.

(10) Patent No.: US 12,002,982 B1
(45) Date of Patent: Jun. 4, 2024

(54) BATTERY PACK ASSEMBLY

(71) Applicant: Rivian IP Holdings, LLC, Irvine, CA (US)

(72) Inventors: Brandon Louis Fennema, Rancho Santa Margarita, CA (US); Jonathan Oliver Samuel De Laine, Claremont, CA (US); Tyler Jacobs, Hawthorne, CA (US); Akshay Kishor Murkute, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/341,454

(22) Filed: Jun. 26, 2023

(51) Int. Cl.
| | |
|---|---|
| *H01M 50/284* | (2021.01) |
| *H01M 10/42* | (2006.01) |
| *H01M 10/48* | (2006.01) |
| *H01M 50/249* | (2021.01) |
| *H01M 50/289* | (2021.01) |

(52) U.S. Cl.
CPC ....... *H01M 50/284* (2021.01); *H01M 10/425* (2013.01); *H01M 10/486* (2013.01); *H01M 50/249* (2021.01); *H01M 50/289* (2021.01); *H01M 2010/4271* (2013.01)

(58) Field of Classification Search
None
See application file for complete search history.

(56) References Cited

U.S. PATENT DOCUMENTS

| | | | | |
|---|---|---|---|---|
| 2011/0076521 A1* | 3/2011 | Shimizu | ............... | H01M 50/529 429/82 |
| 2011/0229745 A1* | 9/2011 | Barter | ................. | H01M 10/486 429/90 |
| 2012/0057316 A1* | 3/2012 | Kaneshige | .......... | H01M 50/213 361/752 |
| 2013/0288096 A1* | 10/2013 | Frutschy | ............. | H01M 50/253 429/99 |
| 2013/0288530 A1* | 10/2013 | Zhao | .................... | H01M 50/503 439/627 |
| 2017/0207430 A1* | 7/2017 | Conrad | ............... | H01M 50/296 |
| 2019/0319231 A1* | 10/2019 | Nguyen | ................ | H01M 50/24 |

FOREIGN PATENT DOCUMENTS

| | | | |
|---|---|---|---|
| JP | 2001145212 A | * | 5/2001 |
| WO | WO-2019071184 A1 | * | 4/2019 |

OTHER PUBLICATIONS

Abstract of JP-2001145212-A. (Year: 2001).*

* cited by examiner

*Primary Examiner* — Gregg Cantelmo
(74) *Attorney, Agent, or Firm* — Foley & Lardner LLP

(57) ABSTRACT

An apparatus can include a cell carrier that defines a first engagement feature and a second engagement feature. The first engagement feature and the second engagement feature can be configured to engage with a housing. The cell carrier can be configured to couple with the housing via at least one of the first engagement feature or the second engagement feature.

20 Claims, 11 Drawing Sheets

BATTERY PACK ASSEMBLY

INTRODUCTION

Battery packs can be used to provide power to electric vehicles.

SUMMARY

Components coupled with a battery subassembly or battery pack can complicate construction of the battery subassembly or pack by using additional fasteners, coupling numerous components separately, and using insulative materials for all components or fasteners due to close proximity to high voltage components of the battery subassembly or pack. The technical solution described herein provides a Battery Voltage and Temperature module (BVT) that follows a 2-way and 4-way locating scheme utilizing two pins in a housing to interface with specific cutouts in a battery tote and a retention scheme that utilizes snap-fit clips or tabs of the housing to interface with different cutouts of the battery tote to couple the BVT with a battery subassembly.

At least one aspect is directed to an apparatus. The apparatus can include a cell carrier that defines a first engagement feature and a second engagement feature. The first engagement feature and the second engagement feature can be configured to engage with a housing. The cell carrier can be configured to couple with the housing via at least one of the first engagement feature or the second engagement feature.

At least one aspect is directed to a method. The method can include providing a cell carrier. The cell carrier can include a first engagement feature and a second engagement feature. The method can include engaging a first interfacing element with the first engagement feature to couple a housing with the cell carrier. The method can include engaging a second interfacing element with the second engagement feature to prevent at least some lateral movement of housing relative to the cell carrier.

At least one aspect is directed to a module. The module can include a housing to couple with a cell carrier. The housing can include a first interfacing element to couple the housing with the cell carrier. The housing can include a second interfacing element to facilitate proper positioning of the housing relative to the cell carrier.

At least one aspect is directed to an electric vehicle. The electric vehicle can include a cell carrier comprising a first engagement feature and a second engagement feature. The electric vehicle can include a module to couple with the cell carrier. The module can include a housing. The housing can include a first interfacing element and a second interfacing element. The first interfacing element can engage with the first engagement feature to couple the module with the cell carrier. The second interfacing element can engage with the second engagement feature to locate the module relative to the cell carrier.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
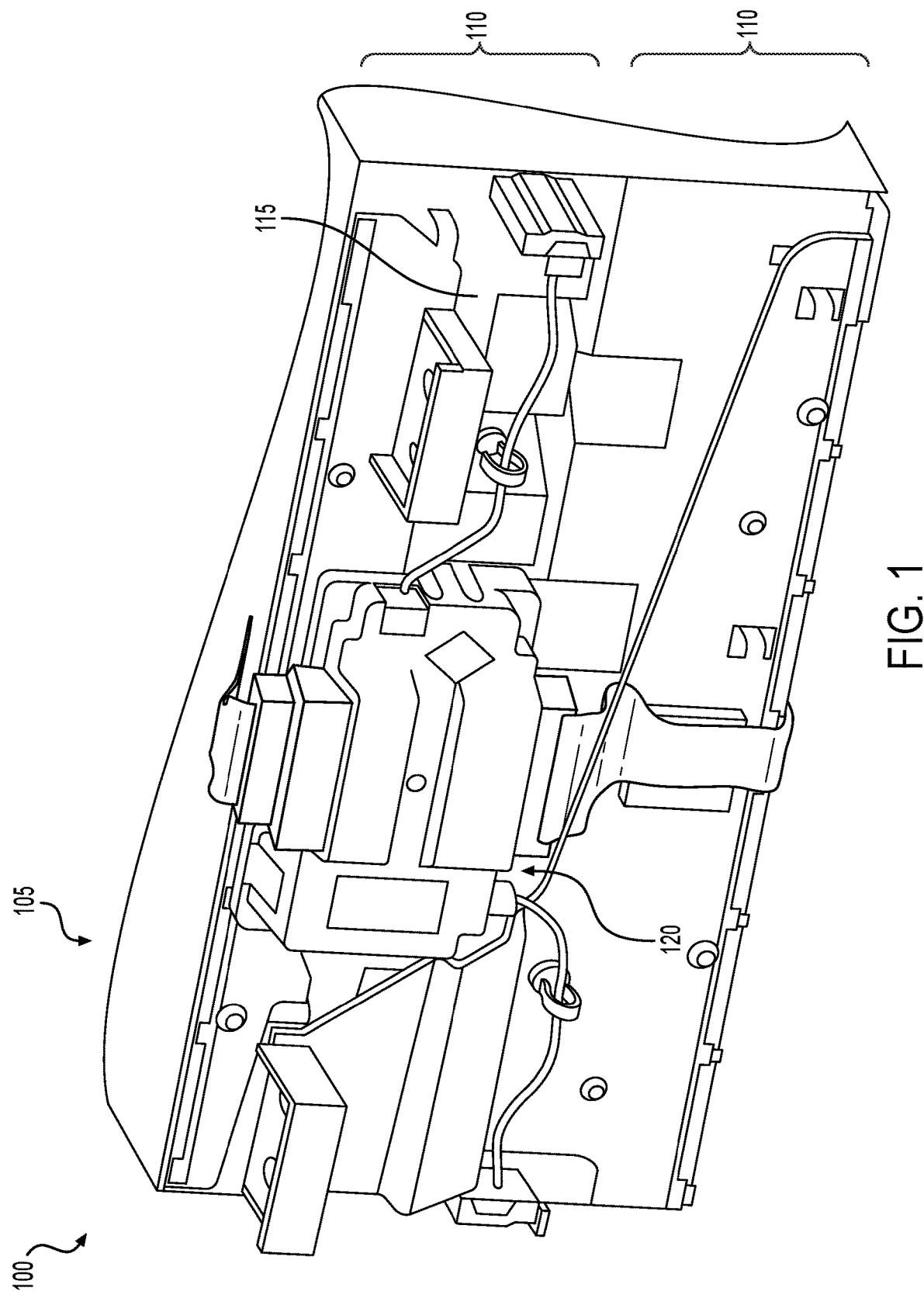
FIG. 1 depicts a front perspective view of an example battery pack assembly, in accordance with some aspects.

Following below are more detailed descriptions of various concepts related to, and implementations of, methods, apparatuses, and systems of a battery pack assembly. The various concepts introduced above and discussed in greater detail below may be implemented in any of numerous ways.

The present disclosure is directed to systems and methods for coupling a Battery Voltage and Temperature module (BVT) with a battery subassembly, a battery module or a battery pack. The disclosed solutions can have a technical advantage of coupling a single modular assembly (e.g., the BVT) with a housing of the battery subassembly (e.g., the cell carrier) without additional fasteners. The BVT can follow an two-way and a four-way locating scheme to facilitate proper positioning of the BVT relative to the cell carrier. The BVT can include retention features to quickly snap the BVT in place with the cell carrier. The BVT can be a modular assembly of various electrical components to monitor or control components of the battery subassembly. For example, the BVT can include a circuit board that is heat staked to the housing of the BVT. The BVT can have various connectors to couple with, for example, a thermistor that can measure a temperature of the battery subassembly or a battery cell thereof, a voltage sensor or balancer that can sense or control voltage that flows through the battery subassembly, or a communication device that can receive, transmit, or analyze data associated with the battery subassembly.

The disclosed solutions can include a cell carrier. The cell carrier can carry or house a battery subassembly (e.g., at least one battery cell). The cell carrier can define a first engagement feature and a second engagement feature. The first engagement feature can facilitate coupling of a BVT to the cell carrier. The first engagement feature can comprise a first retention opening and a second retention opening. The first and second retention openings can receive components of the BVT to couple the BVT with the cell carrier. The second engagement feature can facilitate positioning of the BVT relative to the cell carrier. The second engagement feature can include a first positioning opening and a second positioning opening. The first positioning opening can be a two-way locating feature to prevent lateral movement of the BVT in two directions (e.g., up and down). The second positioning opening can be a four-way locating feature to prevent lateral movement of the BVT in four directions (e.g., up and down, and left and right).

The disclosed solutions can include the BVT. The BVT can include a housing. The housing can include a first interfacing element and a second interfacing element. The first interfacing element can engage with the first engagement feature of the cell carrier to couple the BVT with the cell carrier. The first interfacing element can include at least one tab. The tab can be disposed in one of the retention openings to couple the BVT with the cell carrier. The second interfacing element can engage with the second engagement feature of the cell carrier to locate the BVT relative to the cell carrier. The second interfacing element can include at least one protrusion. The protrusion can be disposed in one of the locating openings to facilitate proper location of the BVT relative to the cell carrier.

The BVT can include a circuit board (e.g., a printed circuit board). The circuit board can be disposed in the housing. The circuit board can be heat staked to the housing. The circuit can be positioned such that it is spaced away from the cell carrier with the housing coupled with the cell carrier. The circuit board can have electronic components on both sides of the circuit board. The housing can include at least one connector. The connector can electrically couple external components with the circuit board. For example, the housing can have a thermistor connector, a voltage sensor or balancer connector, or a communications connector. The housing can include at least one lip to prevent matter from entering the connector. The housing can include a post to provide clearance from a busbar of the cell carrier and prevent rotation of the BVT relative to the cell carrier.

FIG. 1 depicts a front perspective view of an example battery pack assembly 100. The battery pack assembly 100 can include at least one battery pack 105. The battery pack 105 can include at least one battery subassembly 110. For example, the battery pack 105 can have a first (e.g., top) battery subassembly 110 and a second (e.g., bottom) battery subassembly 110. The battery subassembly 110 can house at least one energy storage device, for example, a battery cell. For example, the battery subassembly 110 can have a housing, shown as cell carrier 115. The battery cells can be disposed in the cell carrier 115.

The battery pack assembly 100 can include at least one electronic module, shown as battery voltage and temperature module (BVT) 120. The BVT 1410 can be a monitor, module, controller, or other device. The BVT 120 can be coupled with the battery pack 105. For example, the BVT 120 can be coupled with a battery subassembly 110 of the battery pack 105. The BVT 120 can be coupled with the cell carrier 115 of the battery subassembly 110.

Figure 2:
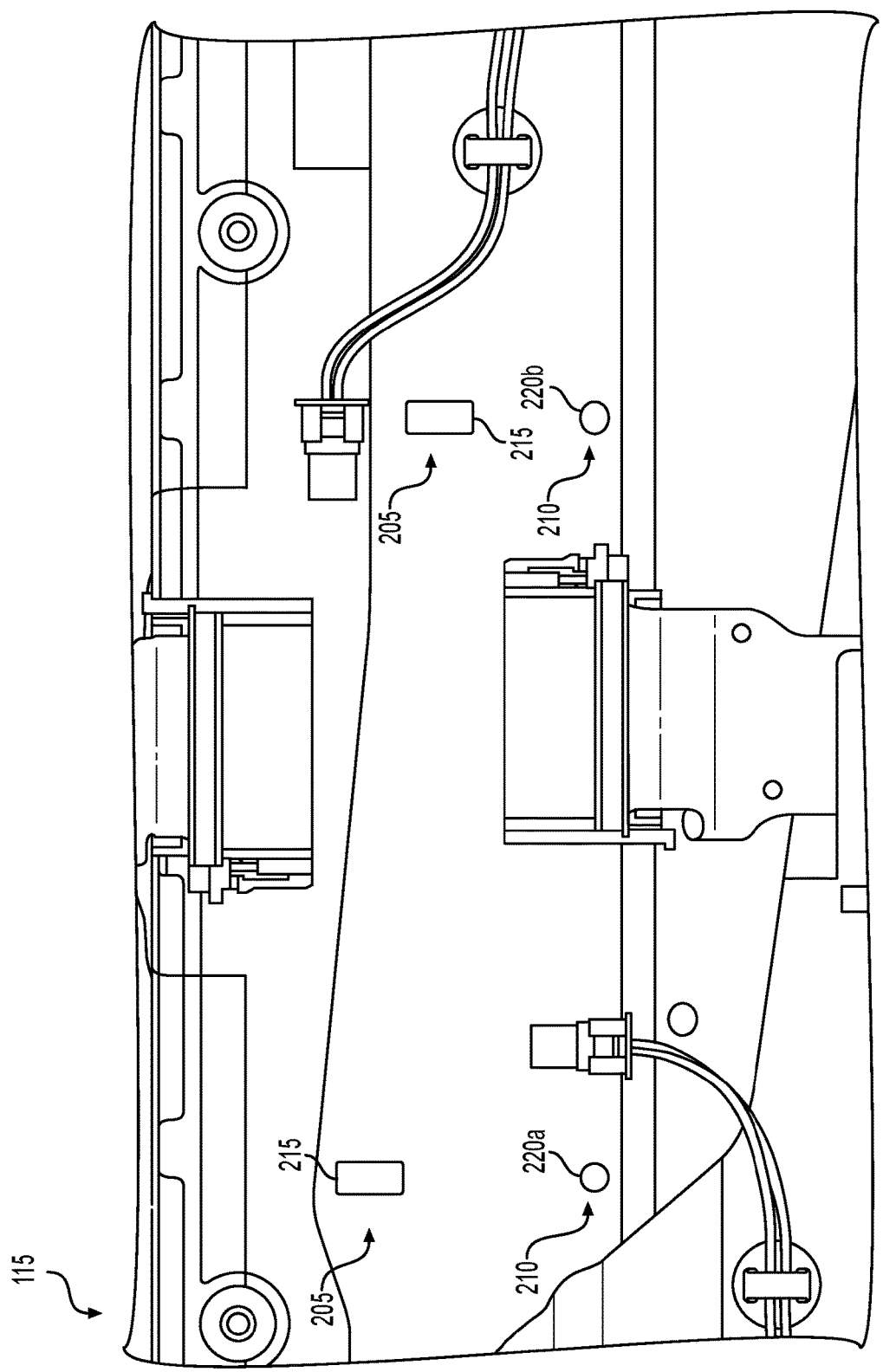
FIG. 2 depicts a front view of a portion of a cell carrier, in accordance with some aspects.

FIG. 2 depicts a front view of an example cell carrier 115. The cell carrier 115 can define at least one engagement feature to engage with a component of the BVT 120. For example, the cell carrier 115 can include at least one first engagement feature 205 to facilitate coupling of the BVT 120 with the cell carrier 115 and at least one second engagement feature 210 to facilitate proper locating of the BVT 120 relative to the cell carrier 115. The first engagement feature 205 can include at least one retention opening 215. The retention opening 215 can be an opening in the cell carrier 115 to receive a component of the BVT 120 to couple the BVT 120 with the cell carrier 115. The cell carrier 115 can have a plurality of retention openings 215. For example, the cell carrier 115 can have a first retention opening 215 and a second retention opening 215. Each of the plurality of retention openings 215 can engage with a corresponding component of the BVT 120 to couple the BVT with the cell carrier 115.

The second engagement feature 210 can include at least one locating opening 220. The locating opening 220 can be an opening in the cell carrier 115 to receive a component of the BVT 120 to facilitate proper positioning of the BVT 120 relative to the cell carrier 115. The locating opening 220 can prevent lateral movement of the BVT 120 relative to the cell carrier 115 in at least two directions. For example, the locating opening 220 can prevent at least up and down movement or left and right movement of the BVT 120 relative to the cell carrier 115.

The cell carrier 115 can have a plurality of locating openings 220. For example, the cell carrier 115 can have a first locating opening 220*a* and a second locating opening 220*b*. The first locating opening 220*a* can provide a two-way locating scheme to prevent or reduce movement of the BVT 120 in two lateral directions. For example, the first locating opening 220*a* can be a slot that can allow horizontal movement (e.g., left and right lateral directions) and can prevent vertical movement (e.g., up and down lateral directions). The second locating opening 220*b* can provide a four-way locating scheme to prevent or reduce movement of the BVT 120 in four lateral directions. For example, the second locating opening 220*b* can be a circle to prevent both vertical and horizontal movement. Each of the locating openings 220 can engage with a corresponding component of the BVT 120 to facilitate proper positioning of the BVT 120 relative to the cell carrier.

Figure 3:
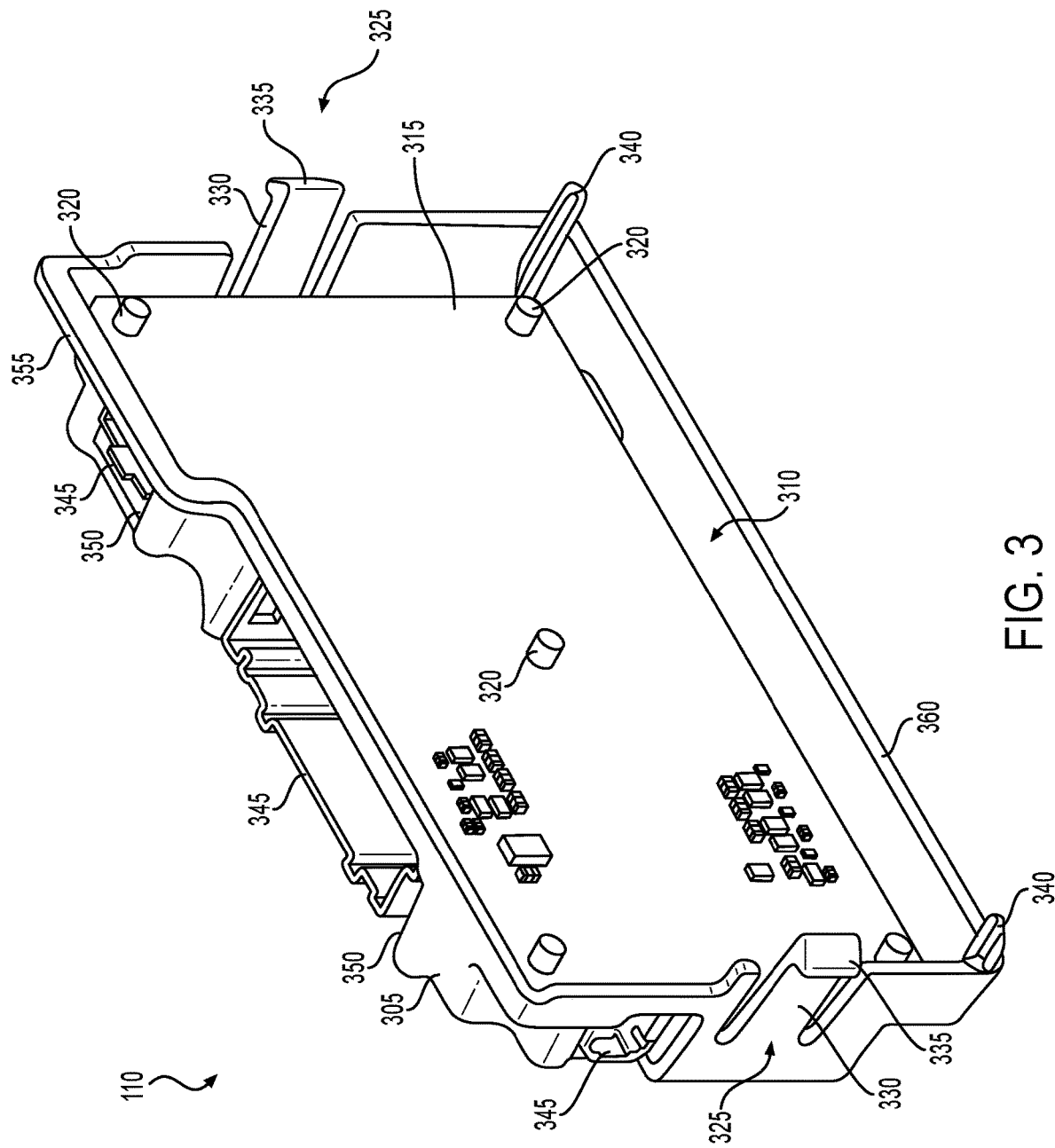
FIG. 3 depicts a rear view of an example module, in accordance with some aspects.
Figure 4:
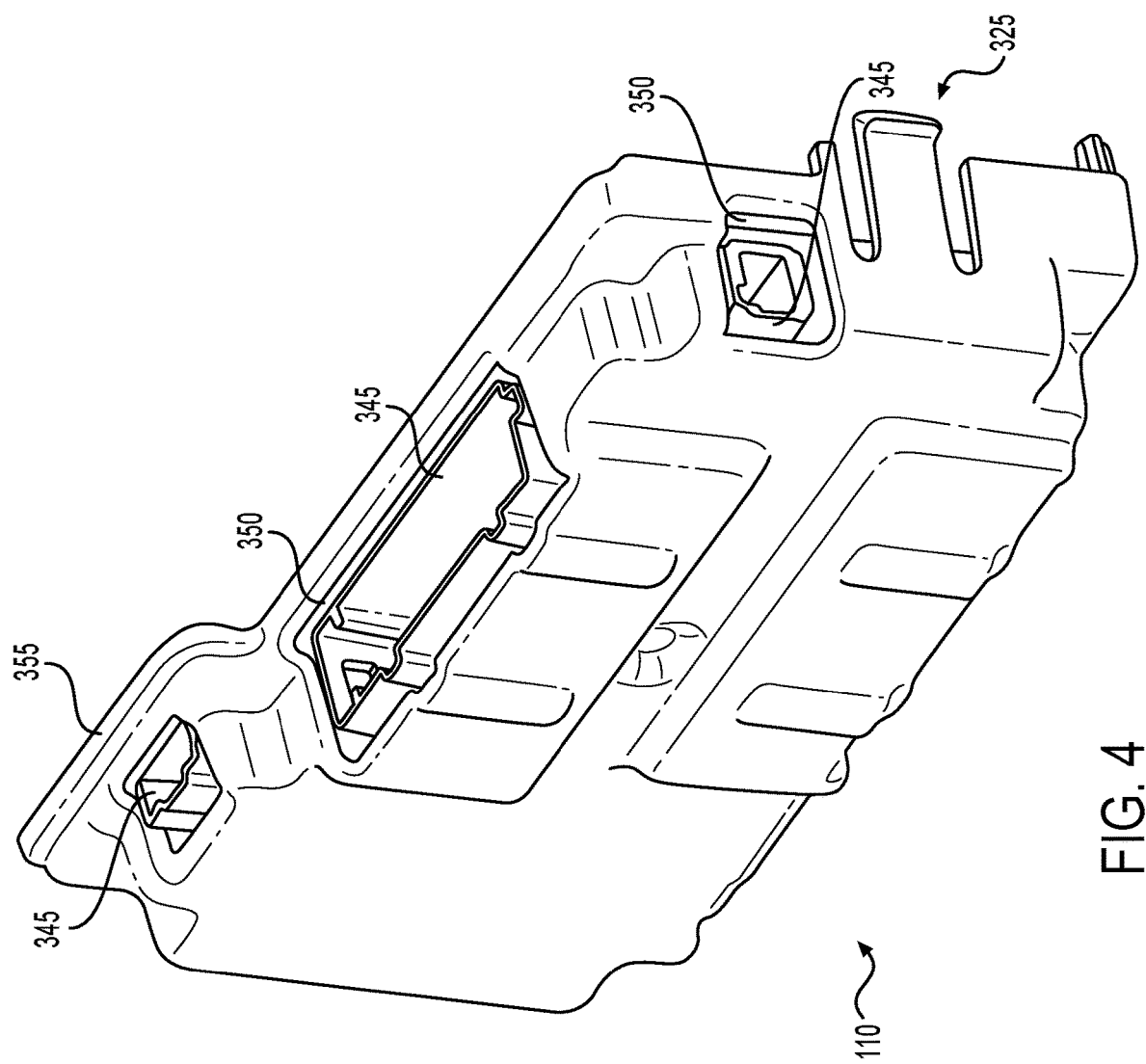
FIG. 4 depicts a front perspective view of an example module, in accordance with some aspects.

FIG. 3 depicts a rear perspective view of an example BVT 120. FIG. 4 depicts a front perspective view of the BVT 120. The BVT 120 can include at least one housing 305. The housing 305 can house or retain various components (e.g., electrical components) associated with a battery pack 105 or battery 110. For example, the housing 305 can house at least one of a voltage sensor, a temperature sensor, or a communications component. The housing 305 can define a cavity 310 to receive the electrical components, or portions thereof. The housing 305 can be made of any material configured to maintain a shape to house such components. The housing 305 can be made of an insulative material to prevent voltage transfer from the battery pack 105 to the housing 305. For example, the housing 305 can be made of a plastic material.

The BVT 120 can include at least one circuit board 315. The circuit board 315 can electrically couple with the various electrical components within the housing 305 or other electrical components coupled with the BVT 120. The circuit board 315 can be a printed circuit board 315. The circuit board 315 can have a first side and a second side. The circuit board 315 can have electrical components on both the first and second sides.

The circuit board 315 can be disposed in the cavity 310 of the housing 305. The circuit board 315 can be coupled with the housing 305. For example, the circuit board 315 can have at least one coupling location 320. The circuit board 315 can be coupled with the housing 305 at each of the coupling locations 320. For example, the circuit board 315 can be heat staked with the housing 305. The circuit board 315 can be heat staked to the housing 305 at each of the coupling locations 320. A coupling location 320 can be, for example, at a corner of the circuit board 315. A coupling location 320 can be at each of the corners of the circuit board 315. The circuit board 315 can have a coupling location 320 at a center (or a more central location) of the circuit board 315.

The housing 305 can position the circuit board 315 at a desired location. For example, the housing 305 can cause the circuit board 315 to be disposed a predetermined distance away from the cell carrier 115 with the housing coupled with the cell carrier 115. The housing 305 can protect the circuit board 315 and other components disposed in the housing 305. For example, the housing 305 can transfer a load between the BVT 120 and the battery 110. The housing 305 can transfer the load in a lateral direction.

The housing 305 can include at least one interfacing element to engage with the engagement features of the cell carrier 115. For example, the housing 305 can include at least one first interfacing element, shown as tab 325. The tab 325 can couple the housing 305 of the BVT 120 with the cell carrier 115. For example, the tab 325 can engage with the first engagement feature 205 of the cell carrier 115 to couple the housing 305 with the cell carrier 115. The tab 325 can enter or extend through the first engagement feature 205 in a direction normal to the cell carrier 115 (or battery pack 105). The housing 305 can couple with the cell carrier 115 such that the battery subassembly 110 does not need an additional bracket or coupling mechanism to couple the housing 305 with the battery subassembly 110.

The first engagement feature 205 can receive at least a portion of the tab 325 to couple the housing 305 with the cell carrier 115. For example, the tab 325 can be flexible and can be at least partially disposed in or extend through the first engagement feature 205. The tab 325 can include an arm 330 and a head 335 disposed at an end of the arm 330. To couple the housing 305 with the cell carrier 115, the arm 330 can extend through the retention opening 215 of the first engagement feature 205 such that the head 335 is disposed inside the cell carrier 115. The arm 330 can move or be deformed when inserting the head 335 through the retention opening 215. The arm 330 can be biased back to its original position such that the tab 325 can snap into the retention opening 215. A portion of the head 335 can interface with the cell carrier 115 to prevent the head 335 from sliding back through the retention opening 215 and the housing 305 from decoupling from the cell carrier 115.

The housing 305 can include a plurality of tabs 325. For example, the housing 305 can include a first tab 325 and a second tab 325. The first tab 325 can be on a different side of the housing 305 than the second tab 325. For example, the first tab 325 can be on an opposite side of the housing 305 than the second tab 325. The tabs 325 can be the same size or have different sizes, or the same shape or different shapes. For example, the tabs 325 can have the same or different widths. Each tab 325 can have a corresponding first engagement feature 205 or retention opening 215. The size or shape of the tabs 325 can be based on the size and shape of the corresponding first engagement feature or retention opening 215. The plurality of tabs 325 can engage with a plurality of retention openings 215 to couple the housing 305 with the cell carrier 115.

The housing 305 can include at least one second interfacing element, shown as protrusion 340. The protrusion 340 can facilitate proper positioning of the housing 305 relative to the cell carrier 115. For example, the protrusion 340 can engage with the second engagement feature 210 of the cell carrier 115 to facilitate proper positioning of the housing 305 relative to the cell carrier 115. The protrusion 340 can enter or extend through the second engagement feature 210 in a direction normal to the cell carrier 115 (or battery pack 105).

The second engagement feature 210 can receive at least a portion of the protrusion 340 to facilitate proper positioning of the housing 305 relative to the cell carrier 115. For example, the protrusion 340 can extend from a rear side of the housing 305 and can be at least partially disposed in or extend through the second engagement feature 210. The protrusion 340 can engage with either the first locating opening 220a or the second locating opening 220b of the second engagement feature 210. The protrusion 340 can prevent lateral movement (e.g., movement parallel with the side of the cell carrier 115 comprising the second engagement feature 210) of the housing 305 in two directions with the protrusion 340 in the first locating opening 220a. The protrusion 340 can prevent lateral movement of the housing 305 in four directions with the protrusion 340 in the second locating opening 220b.

The housing 305 can include a plurality of protrusions 340. For example, the housing 305 can include a first protrusion 340 and a second protrusion 340. The protrusions 340 can be on opposite sides of the housing 305. For example, the first protrusion 340 can be at a bottom right corner of the housing 305 and the second protrusion 340 can be at a bottom left corner of the housing 305. The protrusions 340 can have the same size or different sizes, or the same shape or different shapes. Each protrusion 340 can have a corresponding second engagement feature 210 or locating opening 220. The shape and size of the protrusion 340 can be based on the size and shape of the corresponding second engagement feature 210 or locating opening 220. The plurality of protrusions 340 can engage with a plurality of locating openings 220 to position the housing relative to the cell carrier 115.

The BVT 120 can include at least one connector 345. The connector 345 can electrically couple an external component with the circuit board 315 of the BVT 120. The external component can be, for example, a voltage sensor (e.g., a voltage sensing harness), a temperature sensor, or a communications component, among others. The BVT 120 can have a plurality of connectors 345. The BVT 120 can receive data indicative of a characteristic of a battery subassembly 110 (e.g., temperature, voltage, state of charge, fault status, etc.). The BVT 120 can communicate the characteristic or the data to a battery management system (BMS). For example, the BVT 120 can be in communication with the BMS via a wired or wireless connection. The BMS can include any combination of hardware and software for controlling power, voltage, current or energy of a battery pack 105, a battery subassembly 110, or battery cell 120. The BMS can operate on a computer system of an electric vehicle 905. The BMS can include scripts, controls, computer code or instructions for monitoring, controlling or managing charging or discharging of the battery pack 105. The BMS can include the functionality for routing or distribution of the power from the battery pack 105 to the components of the electric vehicle 905 (e.g., electric motor, powertrain or other electric vehicle 905 components). For example, when an electric vehicle 905 charges, the BMS can regulate power to the battery pack 105 or battery subassembly 110.

The housing 305 can include at last one connector opening 350. The connector opening 350 can expose the connector 345 such that the connector 345 can be accessed and connect to the external components. The connector openings 350 can be disposed around a side of the housing 305.

The housing 305 can include at least one lip 355. The lip 355 can prevent material (e.g., debris, potting material, etc.) from entering a connector opening 350, and therefore a connector 345. For example, the lip 355 can extend from a side of the housing 305 adjacent to a connector opening 350. The lip 355 can extend beyond an edge of the housing 305 such that material would have to go over or around the lip 355 to enter the connector 345 or connector opening 350. The housing 305 can include a lip 355 for each of the connector openings 350 or a subset thereof.

The housing 305 can have a perimeter surface 360. At least a portion of the perimeter surface 360 can interface with the cell carrier 115 with the BVT 120 coupled with the cell carrier 115.

As shown in FIG. 1, among others, the BVT 120 can be disposed on a side of the battery pack 105. For example, the retention openings 215 and the locating openings 220 can be on a side of a cell carrier 115. With a battery pack 105 with a plurality of cell carriers 115, the retention openings 215 and the locating openings 220 can be on at least one of the cell carriers 115. For example, the retention openings 215 and the locating openings 220 can be on a first (e.g., top) cell carrier 115. The BVT 120 can be coupled with the top cell carrier 115. The BVT 120 can be coupled with the bottom cell carrier 115. The BVT 120 can be easily coupled with and decoupled from the cell carrier 115 by snapping the tabs 325 of the housing 305 into the retention openings 215 and then pinching or otherwise manipulating the tabs 325 to pull the tabs 325 out of the retention openings 215.

Figure 5:
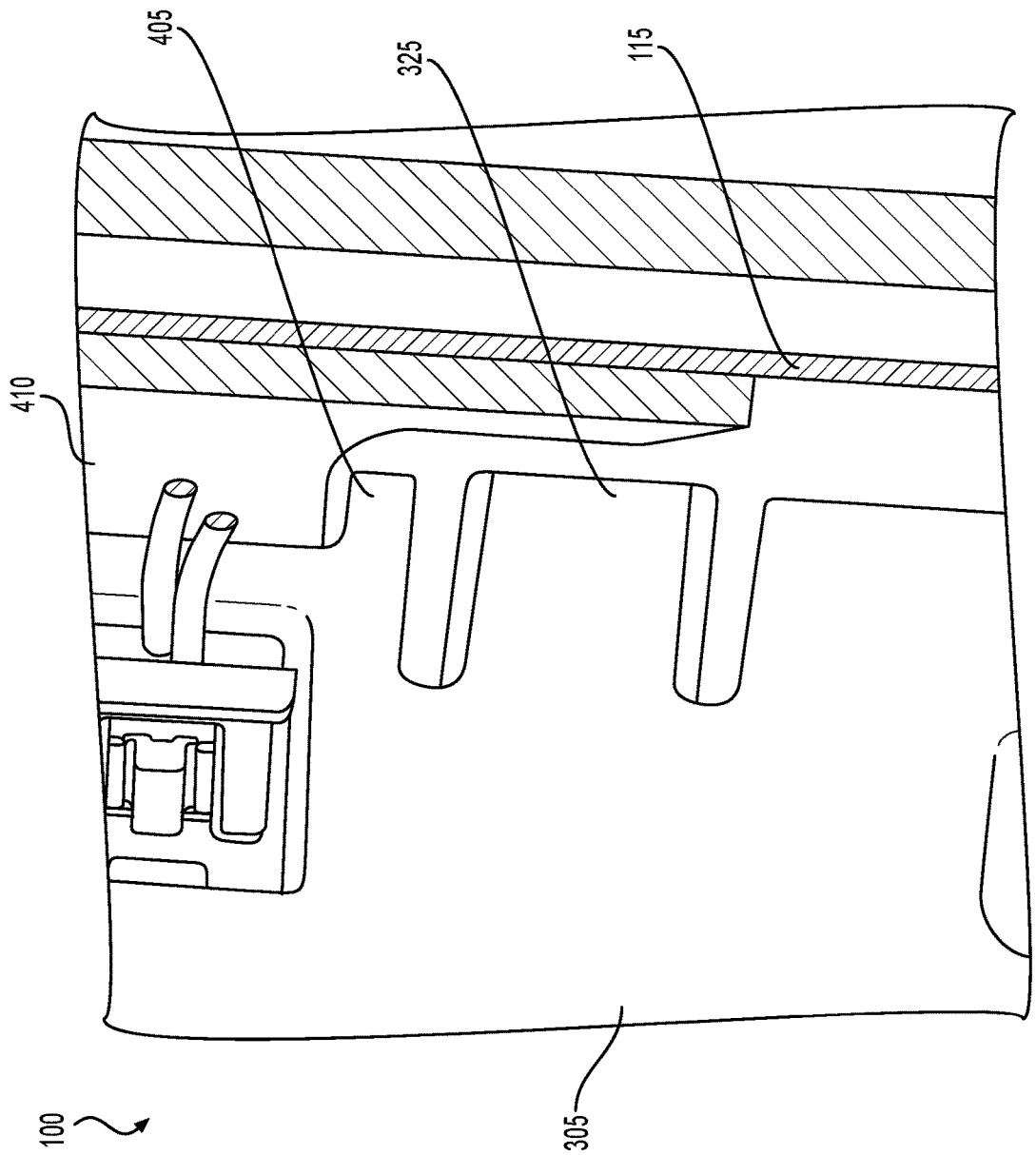
FIG. 5 depicts a partial side perspective view of an example battery pack assembly, in accordance with some aspects.

FIG. 5 depicts a portion of the battery pack assembly 100. The housing 305 can include at least one post 405. The post 405 can provide a barrier for a busbar 410 of the battery subassembly 110 to provide clearance from the busbar 410. The post 405 can prevent rotation of the housing 305 relative to the cell carrier 115. For example, the post 405 can extend from a side of the housing 305. The post 405 can be disposed adjacent to the tab 325 of the housing 305. A busbar 410 can be coupled with the cell carrier 115. The post 405 can abut the busbar 410. The interaction between the post 405 and the busbar 410 can prevent rotation of the housing 305 relative to the cell carrier 115.

Figure 6:
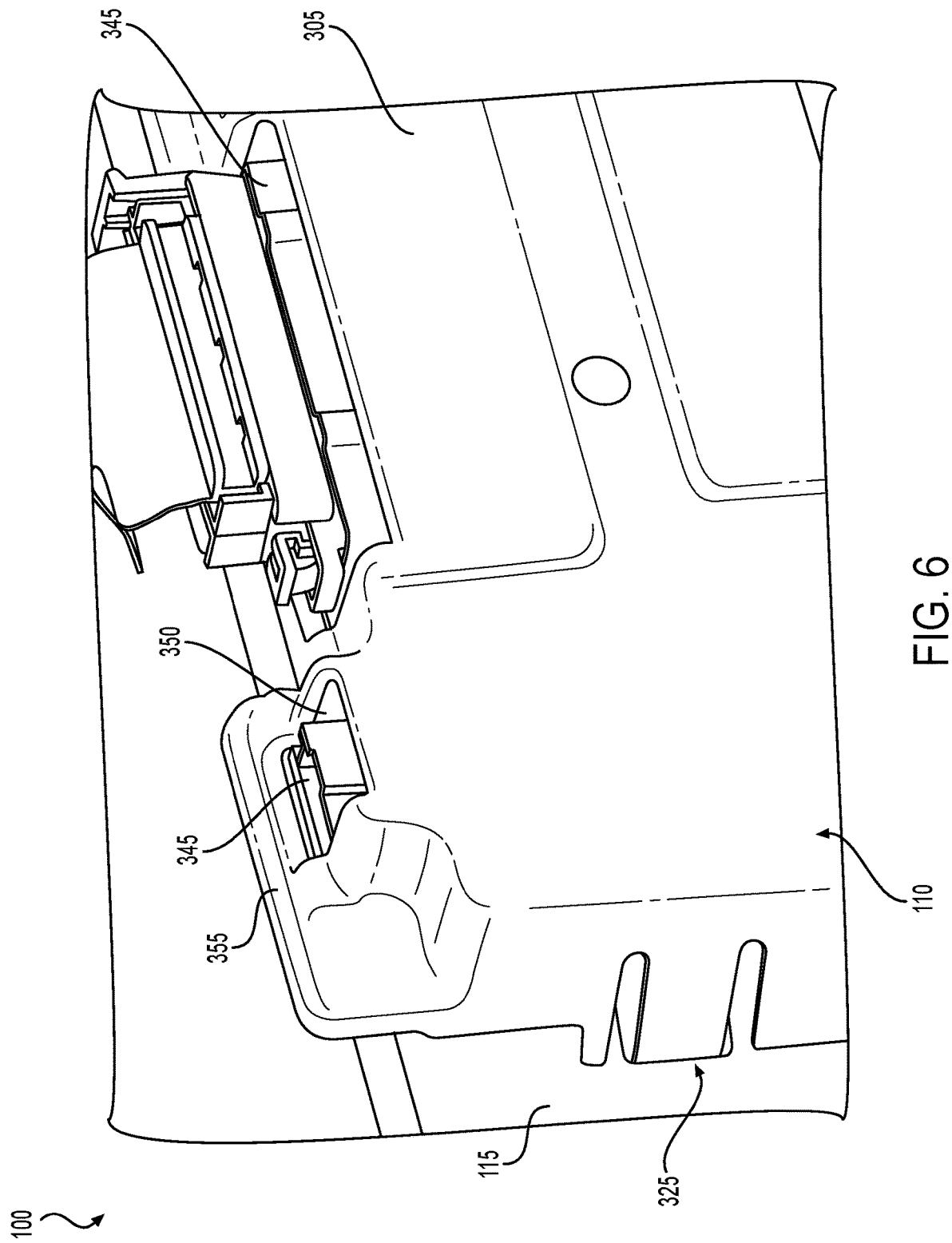
FIG. 6 depicts a partial front perspective view of an example battery pack assembly, in accordance with some aspects.

FIG. 6 depicts a partial front perspective view of the battery pack assembly 100. The BVT 120 can be coupled with the cell carrier 115. The lip 355 of the housing 305 can extend beyond an edge of the battery subassembly 110 to prevent material (e.g., potting material) from entering the connector openings 350 of the housing 305.

Figure 7:
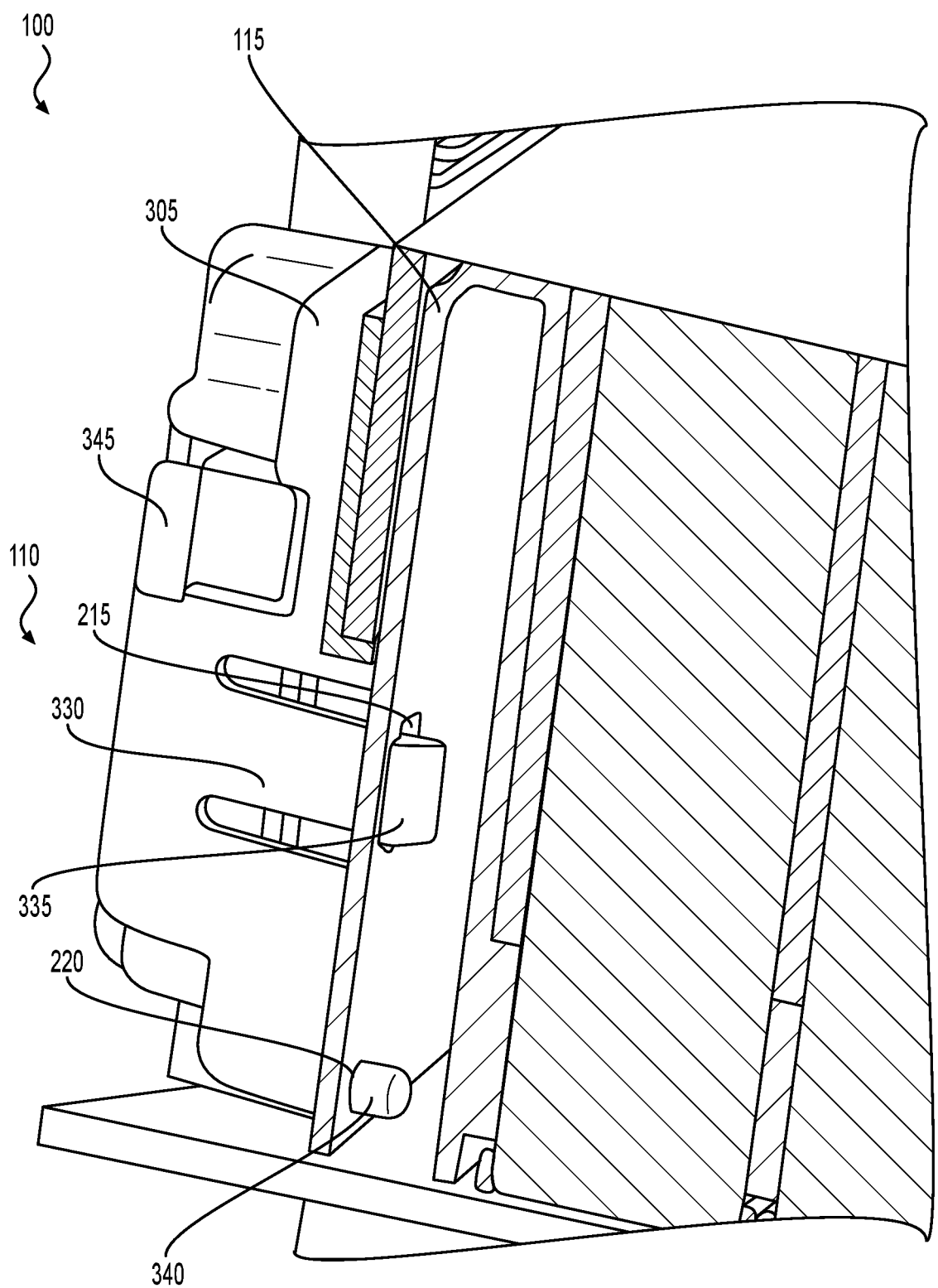
FIG. 7 depicts a partial side cross-sectional view of an example battery pack assembly, in accordance with some aspects.

FIG. 7 depicts a side cross-sectional view of the battery pack assembly 100. With the BVT 120 coupled with the cell carrier 115, a portion of the arm 330 of the tab 325 can extend through a retention opening 215 and the head 335 of the tab 325 can be disposed inside the cell carrier 115 with the remainder of the housing 305 on the outside of the cell carrier 115. A portion of a protrusion 340 can extend through a locating opening 220 with the BVT 120 coupled with the cell carrier 115.

Figure 8:
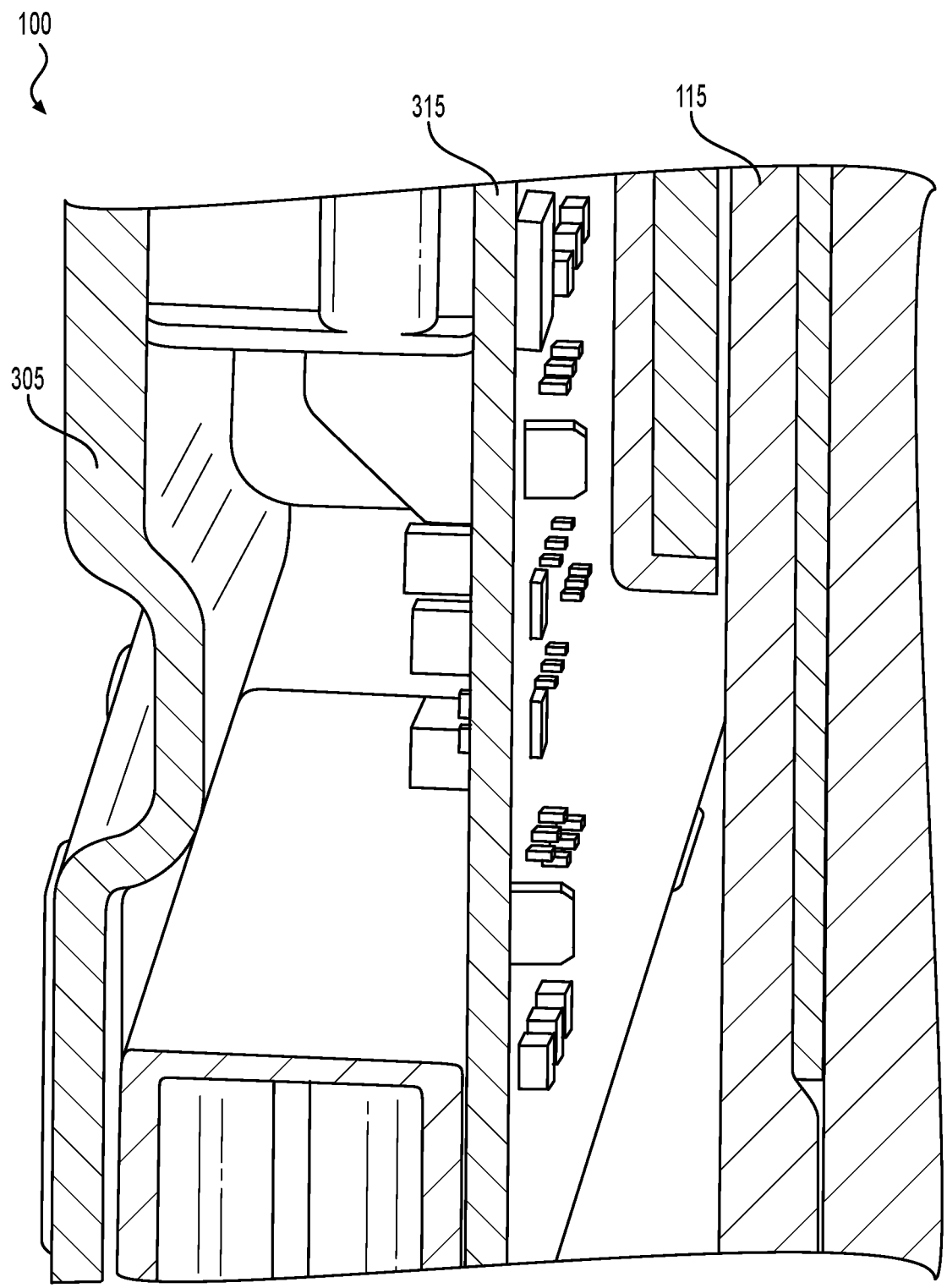
FIG. 8 depicts a partial side cross-sectional view of an example battery pack assembly, in accordance with some aspects.

FIG. 8 depicts a side cross-sectional view of the battery pack assembly 100. The circuit board 315 can be spaced away from the cell carrier 115 with the housing 305 coupled with the cell carrier 115. The circuit board 315 can have electrical components on both sides of the circuit board 315 with the spacing between the cell carrier 115 and the circuit board 315.

Figure 9:
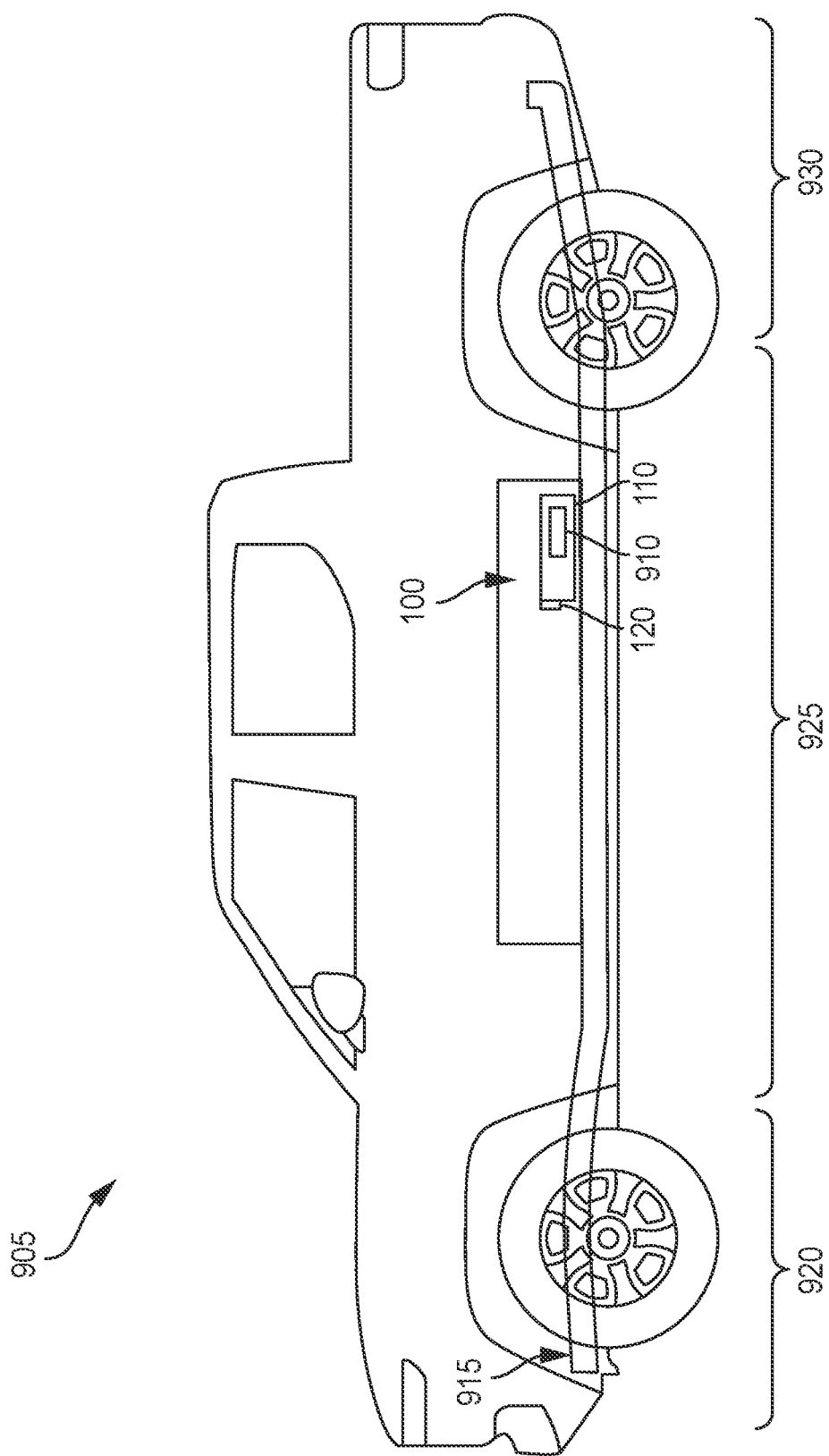
FIG. 9 depicts a side cross-sectional view of an example electric vehicle, in accordance with some aspects.

FIG. 9 depicts is an example cross-sectional view of an electric vehicle 905 installed with at least one battery pack 105. Electric vehicles 905 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. Yet, it should also be noted that battery packs 105 may also be used as an energy storage system to power a building, such as a residential home or commercial building. Electric vehicles 905 can be fully electric or partially electric (e.g., plug-in hybrid) and further, electric vehicles 905 can be fully autonomous, partially autonomous, or unmanned. Electric vehicles 905 can also be human operated or non-autonomous. Electric vehicles 905 such as electric trucks or automobiles can include a battery pack assembly 100, battery subassemblies 110, or battery cells 910 to power the electric vehicles. The electric vehicle 905 can include a chassis 915 (e.g., a frame, internal frame, or support structure). The chassis 915 can support various components of the electric vehicle 905. The chassis 915 can span a front portion 920 (e.g., a hood or bonnet portion), a body portion 925, and a rear portion 930 (e.g., a trunk, payload, or boot portion) of the electric vehicle 905. The battery pack 105 can be installed or placed within the electric vehicle 905. For example, the battery pack 105 can be installed on the chassis 915 of the electric vehicle 905 within one or more of the front portion 920, the body portion 925, or the rear portion 930. The battery pack 105 can include or connect with at least one busbar 410, e.g., a current collector element. For example, the busbar 410 can include electrically conductive material to connect or otherwise electrically couple the battery subassemblies 110 or the battery cells 910 with other electrical components of the electric vehicle 905 to provide electrical power to various systems or components of the electric vehicle 905.

The electric vehicle 905 can include at least one battery pack assembly 100. For example, the electric vehicle 905 can include a battery subassembly 110 and a BVT 120 coupled with the battery subassembly 110. Each battery subassembly 110 can have a designated BVT 120, or a single BVT 120 can be coupled with a plurality of battery subassembly 110.

Figure 10:
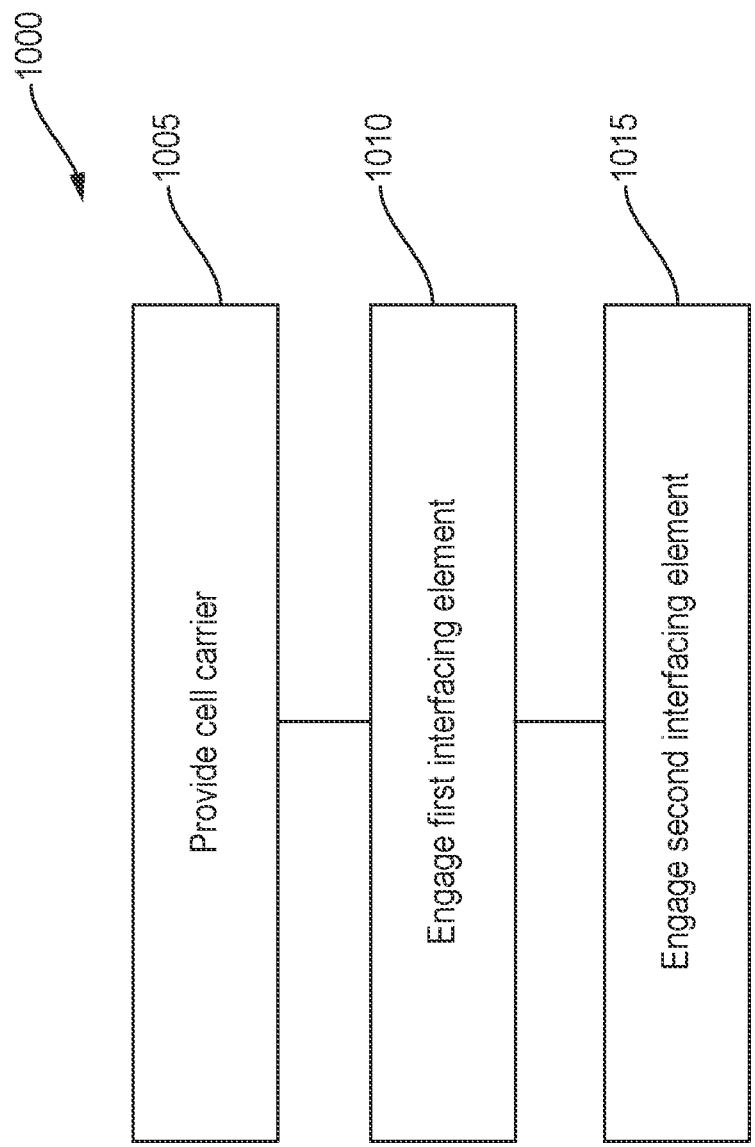
FIG. 10 depicts a flow diagram of an example method of assembling a battery pack assembly, in accordance with some aspects.

FIG. 10 depicts a flow diagram of a method 1000 for assembling a battery pack assembly 100. Method 1000 can include providing a cell carrier 115 (Act 1005). The cell carrier 115 can include a first engagement feature 205 and a second engagement feature 210.

Method 1000 can include engaging a first interfacing element with the first engagement feature 205 (Act 1010). Engaging the first interfacing element with the first engagement feature 205 can include inserting at least a portion of a tab 325 of a housing 305 in a retention opening 215. The housing 305 can be a housing 305 for a BVT 120. Act 1010 can include coupling a housing 305 with the cell carrier 115. For example, the housing 305 can be coupled with the cell carrier 115 via the tab 325. The tab 325 can snap into the retention opening 215 to secure the head 335 of the tab 325 in the cell carrier 115. Act 1010 can include engaging a plurality of tabs 325 of the housing 305 with a plurality of retention openings 215.

Act 1010 can include disposing a circuit board 315 in the housing 305 and coupling the circuit board 315 with the housing 305. The circuit board 315 can be coupled with the housing via heat staking. The circuit board 315 can be disposed a predetermined distance away from the cell carrier 115 such that there is a gap between the circuit board 315 and the cell carrier. With the gap, the circuit board 315 can have electrical components on both sides of the circuit board.

Act 1010 can include preventing material from entering the housing 305. For example, the housing 305 can have a lip 355. The lip 355 can extend from the housing 305 at a location adjacent to a connector opening 350 of the housing 305. The lip 355 can create a barrier such that material has to go around or over the lip 355 before entering the housing 305 via a connector opening 350.

Method 1000 can include engaging a second interfacing element with the second engagement feature 210 (Act 1015). Engaging the second interfacing element with the second engagement feature 210 can include inserting at least a portion of a protrusion 340 in a locating opening 220. Act 1015 can include preventing at least some lateral movement of the housing 305 relative to the cell carrier 115. For example, the housing 305 can have the protrusion 340. The protrusion 340 disposed in the locating opening 220 can prevent at least some lateral movement of the housing 305. For example, the locating opening 220 can be a first locating opening 220a that can provide a two-way locating scheme to prevent or reduce movement of the housing 305 in two lateral directions (e.g., up and down). The locating opening 220 can be a second locating opening 220b that can provide a four-way locating scheme to prevent or reduce movement of the housing 305 in four lateral directions (e.g., up and down, and right and left). Act 1015 can include engaging a plurality of protrusions 340 of the housing 305 with a plurality of locating openings 220. For example, a first protrusion 340 can engage with a first locating opening 220a and a second protrusion 340 can engage with a second locating opening 220b.

Act 1015 can include preventing rotation of the housing 305 relative to the cell carrier 115. For example, the housing 305 can have a post 405. The post 405 can interface with a busbar 410 coupled with the cell carrier 115. The post 405 can prevent rotation of the housing 305 relative to the cell carrier 115. Act 1015 can include providing a clearance from the busbar 410. For example, the post 405 can abut the busbar 410 to create a barrier between the busbar 410 and other components of the BVT 120.

Figure 11:
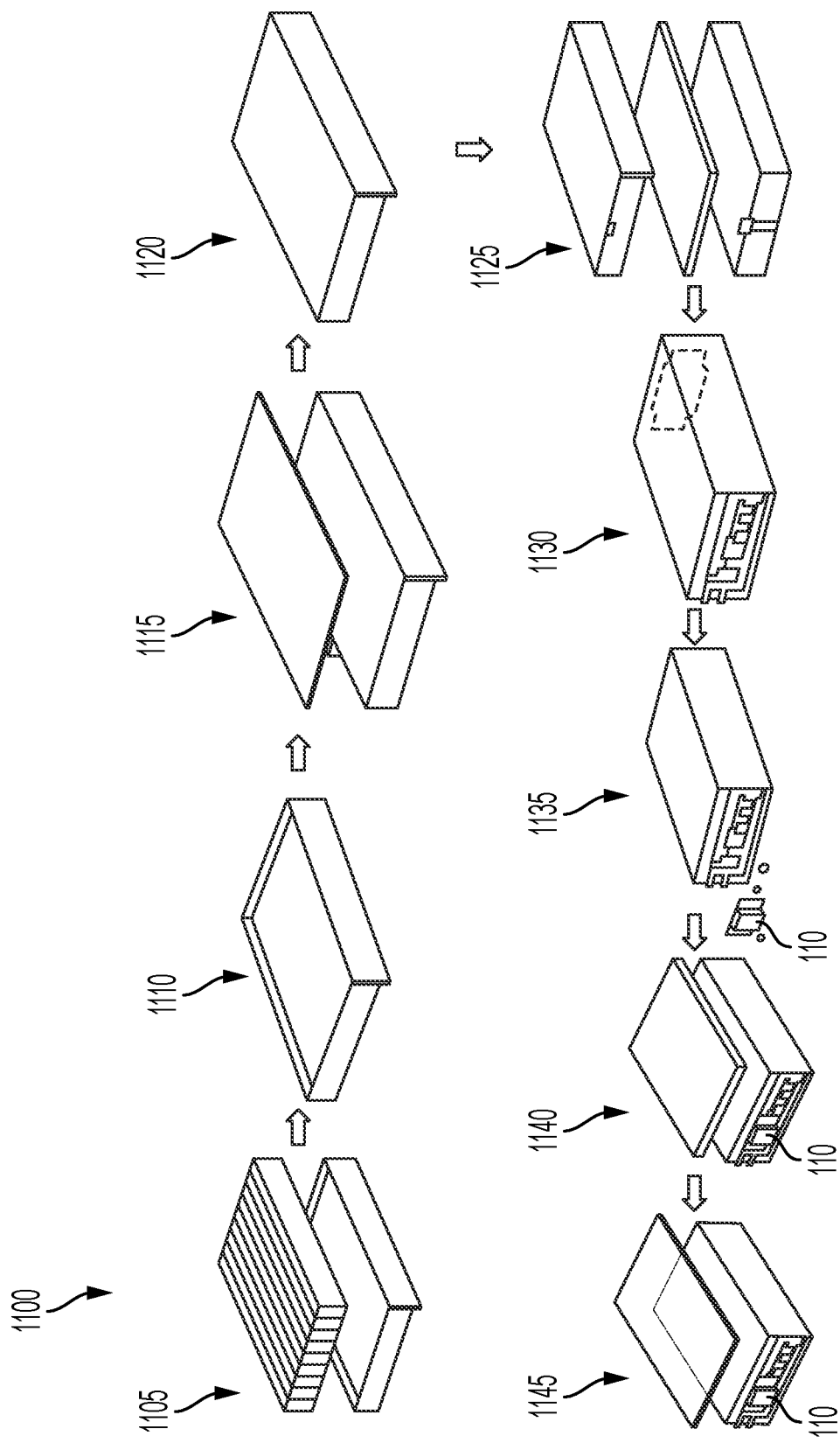
FIG. 11 depicts an example flowchart of an example method of forming a battery subassembly, in accordance with some aspects.

FIG. 11 depicts a flow diagram of a method 1100 for forming a battery subassembly 110. Method 1100 can include loading at least one battery cell 910 into a cell carrier 115 (Act 1105). Method 1100 can include applying an adhesive (e.g., wicking adhesive) to the battery cell 910 or cell carrier 115 to facilitate fixing the battery cell 910 to the cell carrier 115 (Act 1110). Method 1100 can include coupling a current collector assembly (CCA) with the battery cell 910 (Act 1115). Method 1100 can include welding the CCA to at least one cell terminal (e.g., button) (Act 1120). Method 1100 can include coupling a first cell carrier 115, a thermal component, and a second cell carrier 115 together to form a battery subassembly 110 (Act 1125). For example, at least a portion of an area between a battery cell 910 and the thermal component can be filled with a thermal adhesive to couple the thermal component with the battery cell 910.

Method 1100 can include coupling terminal busbars and series busbars with the battery subassembly 110 (Act 1130). Method 1100 can include coupling various components such as fuses, switches, current sensors, temperature sensors, voltage sensors, thermistors, contactors, and/or the like with the battery subassembly 110 (Act 1135). For example, a thermistor harness and/or a BVT 120 configured to receive electrical signals, data packets, measurements, sensor readings, or other data to indicate characteristics of the battery subassembly 110 such as temperature, voltage, state of charge and/or fault status for communication to a battery management system (BMS) can be coupled with the battery subassembly 110.

Act 1135 can include aligning at least one protrusion 340 of the housing 305 with a locating opening 220. For example, a first protrusion 340 can align with a first locating opening 220a and a second protrusion 340 can align with a second locating opening 220b. The protrusions 340 can extend into the locating openings 220. Act 1135 can include aligning at least one tab 325 with a retention opening 215. The tab 325 can extend through the retention opening 215 and couple the BVT 120 with the cell carrier 110. For example, the tab 325 flex or deform slightly to enter the retention opening 215 and return to its original position to snap the BVT 120 into place to couple the BVT 120 with the cell carrier 110.

With the BVT 120 coupled with the cell carrier 110, at least one lip 355 of the housing 305 can extend beyond an edge or side of the cell carrier 115. The lip 355 can prevent material (e.g., adhesive and potting) from contaminating or traveling into the BVT 120. The material can clog connectors 345 or connector openings 350, and render BVT 120, or a portion thereof, inoperable. The lip 355 can prevent or reduce this contamination to protect the BVT 120 and the various components disposed therein.

Method 1100 can include potting (e.g., partially or completely filling a space between the batteries with a compound to provide resistance to shock waves or vibrations) subsequent to the first carrier 110 being coupled with the second carrier 110 with the thermal component disposed in between the carriers 110 (Act 1140). The lip 355 of the housing 305 can be a barrier to prevent the potting (or adhesive) from entering the housing 305, a connector 345, or a connector opening 350. Method 1100 can include coupling a touch cover with the subassembly (Act 1145).

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

While operations are depicted in the drawings in a particular order, such operations are not required to be performed in the particular order shown or in sequential order, and all illustrated operations are not required to be performed. Actions described herein can be performed in a different order.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. For example, up and down, or left and right can be reversed or interchangeable based on orientation of the system. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An apparatus, comprising:
a cell carrier that defines a first engagement feature and a second engagement feature, the first engagement feature defines an opening located on a side of the cell carrier, the cell carrier to house an energy storage device; and
a housing engaged with the first engagement feature and the second engagement feature, the housing comprises a first interface element extending through the opening to couple the housing with the cell carrier, a portion of the first interface element disposed inside the cell carrier with the housing coupled with the cell carrier; and
the cell carrier configured to couple with the housing via the first engagement feature.

2. The apparatus of claim 1, comprising:
the housing comprising a second interface element;
the second engagement feature to receive the second interface element to facilitate proper positioning of the housing relative to the cell carrier.

3. The apparatus of claim 1, comprising:
the second engagement feature comprising a first opening and a second opening, the first opening providing a two-way locating scheme for the housing and the second opening providing a four-way locating scheme for the housing.

4. The apparatus of claim 1, comprising:
a balancing voltage and temperature module (BVT), the BVT comprising the housing and a circuit board, the circuit board heat staked with the housing.

5. The apparatus of claim 1, comprising:
a circuit board disposed in the housing, the circuit board comprising a first side and a second side, the circuit board comprising electrical components on both the first side and the second side.

6. The apparatus of claim 1, comprising:
a circuit board coupled with the housing, the circuit board to be spaced away from the cell carrier with the housing coupled with the cell carrier.

7. The apparatus of claim 1, comprising:
the housing comprising a plurality of tabs and a plurality of protrusions;
the first engagement feature comprising a plurality of retention openings, the plurality of tabs to engage with the plurality of retention openings to couple the housing with the cell carrier; and
the second engagement feature comprising a plurality of locating openings, the plurality of protrusions correspond with the plurality of locating openings to position the housing relative to the cell carrier.

8. The apparatus of claim 1, comprising:
a circuit board disposed in the housing; and
the housing comprising a connector to electrically couple an external component with the circuit board, the external component comprising at least one of a voltage sensor, a temperature sensor, or a communications component.

9. The apparatus of claim 1, comprising:
the housing comprising:
    a connector opening to expose a connector to electrically couple with an external component; and
    a lip extending from a side of the housing adjacent the connector opening, the lip to prevent material from entering the connector opening and the connector.

10. The apparatus of claim 1, comprising:
the housing comprising a post, the post to abut a busbar coupled with the cell carrier, the post to provide clearance from the busbar and prevent rotation of the housing relative to the cell carrier.

11. A method, comprising:
providing a cell carrier, the cell carrier defines a first engagement feature and a second engagement feature, the first engagement feature defines an opening located on a side of the cell carrier, the cell carrier to house an energy storage device;
engaging a first interface element of a housing with the first engagement feature to couple the housing with the cell carrier, the first interface element extends through the opening to couple the housing with the cell carrier, a portion of the first interface element disposed inside the cell carrier with the housing coupled with the cell carrier; and
engaging a second interfacing element with the second engagement feature to prevent at least some lateral movement of the housing relative to the cell carrier.

12. The method of claim 11, comprising:
disposing a circuit board in the housing; and
coupling the circuit board with the housing via heat staking.

13. The method of claim 11, comprising:
coupling a circuit board with the housing, the circuit board to be disposed away from the cell carrier with the housing coupled with the cell carrier, the circuit board comprising a first side and second side, the circuit board comprising electrical components on both the first side and the second side.

14. The method of claim 11, wherein the first engagement feature comprises a plurality of retention openings and the second engagement feature comprises a plurality of locating openings, the method comprising:
engaging a plurality of tabs of the housing with the plurality of retention openings; and
engaging a plurality of protrusions of the housing with the plurality of locating openings.

15. The method of claim 11, comprising:
preventing rotation of the housing relative to the cell carrier via a post of the housing; and
providing a clearance from a busbar of the cell carrier via the post.

16. The method of claim 11, comprising:
preventing material from entering the housing via a lip of the housing, the lip extending from the housing at a location adjacent to a connector opening of the housing.

17. A subassembly, comprising:
a housing to couple with a cell carrier, the housing comprising:
    a first interface element to couple the housing with the cell carrier;
    a second interface element to facilitate proper positioning of the housing relative to the cell carrier,
    a side defining a connector opening; and
    a lip extending from the side in front of the connector opening, the lip extends beyond an edge of a cell carrier with the housing coupled with the cell carrier, the lip forms a barrier to prevent material from entering the connector opening.

18. The subassembly of claim 17, comprising:
a circuit board disposed in the housing, the circuit board comprising a first side and a second side, the circuit board comprising electronics on both the first side and the second side.

19. The subassembly of claim 17, comprising:
the housing comprising a post, the post to provide clearance from a busbar of the cell carrier and to prevent rotation of the housing relative to the cell carrier.

20. The subassembly of claim 17, comprising:
a circuit board disposed in the housing; and
the housing comprising a connector to electrically couple an external component with the circuit board.

* * * * *